United States Patent
Mashinsky et al.

(10) Patent No.: US 6,912,277 B1
(45) Date of Patent: Jun. 28, 2005

(54) ASSIGNING TELECOMMUNICATIONS SERVICES TO MATCHABLE CLASSES

(75) Inventors: Alexander Mashinsky, New York, NY (US); Daniel Jitzchak Mayer, Warren, NJ (US)

(73) Assignee: ANIP, Inc., Carson City, NV (US)

( * ) Notice: Subject to any disclaimer, the term of this patent is extended or adjusted under 35 U.S.C. 154(b) by 0 days.

(21) Appl. No.: 09/368,828

(22) Filed: Aug. 5, 1999

Related U.S. Application Data (63) Continuation-in-part of application No. 09/213,703, filed on Dec. 17, 1998, now Pat. No. 6,144,727, which is a continuation-in-part of application No. 09/129,413, filed on Aug. 5, 1998, now Pat. No. 6,226,365, which is a continuation-in-part of application No. 08/927,443, filed on Sep. 11, 1997, now Pat. No. 6,005,926, which is a continuation-in-part of application No. 08/920,567, filed on Aug. 29, 1997, now abandoned.

(51) Int. Cl.$^7$ .......................... H04M 15/00; G06F 17/60
(52) U.S. Cl. ........................... 379/114.12; 379/114.03; 379/114.05; 705/23; 705/37
(58) Field of Search .................................. 379/111, 113, 379/114, 115, 121, 124, 144, 219, 220, 221; 705/23, 26, 27, 37; 380/23, 25, 49

(56) References Cited

U.S. PATENT DOCUMENTS

| | | |
|---|---|---|
| 4,068,101 A | 1/1978 | Chemarin |
| 4,166,929 A | 9/1979 | Shenbein |
| 4,313,035 A | 1/1982 | Jordan et al. |

(Continued)

FOREIGN PATENT DOCUMENTS

| | | | |
|---|---|---|---|
| EP | 0501903 | 9/1992 | ............ H04M/1/66 |
| EP | 0658061 | 6/1995 | ............ H04Q/3/00 |
| GB | 2198011 | 6/1988 | ............ H04M/3/42 |

(Continued)

OTHER PUBLICATIONS

"Survey: Telecoms", in *The Economist*, vol. 344, No. 8034 (Sep. 13, 1997), pp56/1–56/34.

"Auctioning Telephone Calls", in *The Economist*, vol. 344, No. 8032 (Aug. 30, 1997), pp47–48.

(Continued)

*Primary Examiner*—Binh Tieu

(57) ABSTRACT

A telecommunications services exchange that assigns telecommunications services to a relatively small number of tagged classes based on the values of certain parameters characterizing these services is disclosed. Carriers and other traders participating in the exchange may use the class tag to refer to each service they seek to purchase or sell. The relatively small number of classes increases the probability of matching offered and required services. Class definitions may be established on the basis of typical parameter values for a particular type of service, and may be modified over time as those values change. The exchange operator may monitor the parameter variation of each offered service, and swap that service for a different service when monitored variation exceeds that dictated by class boundaries. The system may employ a hysteresis band of suitable dimensions to ensure that the assignment of offered services to classes is as stable as desired when remaining sensitive to meaningful variations in parameter values.

66 Claims, 11 Drawing Sheets

U.S. PATENT DOCUMENTS

| | | | |
|---|---|---|---|
| 4,313,036 A | | 1/1982 | Jabara et al. |
| 4,594,477 A | | 6/1986 | Noirot |
| 5,012,515 A | | 4/1991 | McVitie ....................... 380/49 |
| 5,027,387 A | | 6/1991 | Moll .......................... 379/112 |
| 5,065,393 A | | 11/1991 | Sibbit et al. ............... 370/58.2 |
| 5,163,042 A | | 11/1992 | Ochiai .......................... 370/10 |
| 5,247,676 A | | 9/1993 | Ozur et al. .................. 395/650 |
| 5,311,583 A | | 5/1994 | Friedes et al. .............. 379/209 |
| 5,313,467 A | | 5/1994 | Varghese et al. |
| 5,353,331 A | | 10/1994 | Emery et al. .................. 379/58 |
| 5,408,518 A | | 4/1995 | Yunoki ....................... 379/67.1 |
| 5,408,526 A | | 4/1995 | McFarland et al. ......... 379/202 |
| 5,414,752 A | | 5/1995 | Jonsson ....................... 379/58 |
| 5,425,084 A | | 6/1995 | Brinskele .................... 379/112 |
| 5,425,091 A | | 6/1995 | Josephs ....................... 379/201 |
| 5,438,616 A | | 8/1995 | Peoples ....................... 379/201 |
| 5,479,495 A | | 12/1995 | Blumhardt ................... 379/207 |
| 5,506,887 A | | 4/1996 | Emery et al. .................. 379/58 |
| 5,515,425 A | | 5/1996 | Penzias et al. .............. 379/114 |
| 5,526,413 A | | 6/1996 | Cheston et al. ............. 379/201 |
| 5,533,100 A | | 7/1996 | Bass et al. .................. 379/67.1 |
| 5,606,602 A | | 2/1997 | Johnson et al. ............. 379/115 |
| 5,608,782 A | | 3/1997 | Carlsen et al. ................ 379/63 |
| 5,608,786 A | | 3/1997 | Gordon ...................... 379/100 |
| 5,638,363 A | | 6/1997 | Gittins et al. ............... 370/358 |
| 5,661,790 A | | 8/1997 | Hsu ........................... 379/209 |
| 5,675,636 A | | 10/1997 | Gray .......................... 379/114 |
| 5,706,507 A | | 1/1998 | Schloss ....................... 395/615 |
| 5,764,741 A | | 6/1998 | Barak ......................... 379/114 |
| 5,771,279 A | | 6/1998 | Cheston et al. ........... 379/93.07 |
| 5,790,642 A | | 8/1998 | Taylor et al. ............... 379/112 |
| 5,794,207 A | * | 8/1998 | Walker et al. ................ 705/23 |
| 5,825,858 A | | 10/1998 | Shaffer et al. .............. 379/120 |
| 5,917,897 A | | 6/1999 | Johnson et al. ............. 379/114 |
| 5,940,479 A | | 8/1999 | Guy et al. ................ 379/93.01 |
| 5,970,126 A | | 10/1999 | Bowater et al. ............ 379/114 |
| 5,999,598 A | * | 12/1999 | Henrick et al. .......... 379/93.07 |
| 6,005,926 A | * | 12/1999 | Mashinsky .................. 379/114 |
| 6,047,006 A | | 4/2000 | Brakefield et al. .......... 370/524 |
| 6,144,727 A | * | 11/2000 | Mashinsky .................. 379/112 |
| 6,226,365 B1 | * | 5/2001 | Mashinsky .................. 379/112 |
| 6,269,157 B1 | * | 7/2001 | Coyle ......................... 379/114 |
| 6,345,090 B1 | * | 2/2002 | Walker et al. ......... 379/114.12 |

FOREIGN PATENT DOCUMENTS

| | | | | |
|---|---|---|---|---|
| GB | | 2316266 | 2/1998 | |
| WO | | WO 92-01350 | 1/1992 | ............ H04M/3/42 |
| WO | | WO 93-16543 | 8/1993 | ............ H04M/3/42 |
| WO | | WO 93-16544 | 8/1993 | ............ H04M/3/42 |
| WO | | WO 93-16546 | 8/1993 | ............ H04M/3/42 |
| WO | | WO 94-28683 | 12/1994 | ............ H04Q/3/00 |
| WO | | WO 94/28683 | * 12/1994 | ............ H04Q/3/00 |
| WO | | WO 97/16916 | 5/1997 | ............ H04M/9/06 |
| WO | | WO 99/11051 | * 3/1999 | .......... H04M/15/00 |
| WO | | WO 01/11860 | * 2/2001 | .......... H04M/15/00 |

OTHER PUBLICATIONS

"Book Review, Impact Of Liberalization On Resale And Callback Telecommunications Policy", vol. 21, No. 3, pp275–276 (1997).

Brennan, "Industry Parallel Interconnection Agreements", Information Economics and Policy, vol. 9, No. 2, pp133–149.

Tao et al., "Internet Access via Baseband and Broadband ISDN Gateways", Dec. 4, 1994 (IEEE).

R. Frieden, "The International Telecommunications Toll Revenue Division Process", *International Telecommunications Handbook* (1996), pp133–149.

Y. Levy, S. Durinovic–Johri, and R.A. Milito, "Dynamic Network Call Distribution with Periodic Updates", in *Teletrafic Science and Engineering*, vol. 1a (J. Lbetoulle, and J.W. Roberts, ed.) (1994), Elsevier.

Raif O. Onvural, *Asynchronous Transfer Mode Networks: Performance Issues* (1994), Section 6.3–6.4, Artech House.

B. Yuhas & N. Ansari ed., *Neural Networks in Telecommunications* (1994), Chapter 1, Kluwer.

Globerman et al., "Competition in Public Long–distance Telephone Markets in Canada", Telecommunications Policy, vol. 17, No. 4, pp297–312 (1993).

R. Frieden, "International Toll Revenue Division: Tackling the Inequities and Inefficiencies", in *Telecommunications Policy*, vol. 17, No. 3 (Apr., 1993), pp221–133.

R.J. Horrocks & R.W.A. Scarr, "Chapter 24: Tariff Principles", in *Future Trends in Telecommunications* (1993), pp 387–392, J. Whitaker & Sons.

K. Cheong & M. Mullins, "International Telephone Service Imbalances: Accounting Rates and Regulatory Policy", Telecommunications Policy, vol. 15, No. 2 (Apr., 1991), pp107–118.

R.M. Frieden, "Accounting rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).

N.F. Maxemchuk & M. El Zarki, "Routing and Flow control in High–Speed Wide–Area Networks", in *Proceedings of the IEEE*, vol. 78, No. 1 (Jan. 1990), pp204–221, IEEE.

A. Girard, *Routing and Dimensioning in Circuit–Switched Networks* (1990), Addison–Wesly, (Table of Contents only).

B. Warfield & P. Sember, "Prospects for the Use of Artificial Intelligence in Real–Time Network Traffic Management", in *Computer Networks and ISDN Systems*, vol. 20 (1990), pp163–169, Elsevier Science.

J. Potvin, & S.F. Smith, "Flexible Systems for the Design of Heuristic Algorithms in Comples or Domains", in *Impract of Recent Computer Advances on Operations Research* (1989), PP 332–344, Elsevier Science.

G.L. Shultz & R.R. Meyer, "Flexible Parallel Algorithm for Block–Constained Optimization Problems", in *Impact of Recent Computer Advances on Operations Research* (1989), PP 82–91.

M. Schwartz, *Telecommunications Networks* (1987), Sec. 6–2, Additon–Wesley.

* cited by examiner

GRADE A
- good speech clarity, <u>and</u>
- no perceptible loudness degradation, <u>and</u>
- no perceptible noise, <u>and</u>
- no perceptible cross-talk, <u>and</u>
- full duplex communications with imperceptible echo, <u>and</u>
- one-way latency shorter than 100 milliseconds

FIG.3A

GRADE B
- fully comprehensible speech with little clarity degradation, <u>or</u>
- fully comprehensible speech with little loudness degradation, <u>or</u>
- fully comprehensible speech with little perceptible noise, <u>or</u>
- fully duplex communication with barely perceptible echo, <u>or</u>
- barely perceptible cross-talk, <u>or</u>
- one-way latency between 101 and 135 milliseconds

FIG.3B

GRADE C
- fully comprehensible speech with some clarity degradation, <u>or</u>
- fully comprehensible speech with some loudness degradation, <u>or</u>
- fully comprehensible speech with some perceptible noise, <u>or</u>
- fully duplex communication with barely perceptible echo, <u>or</u>
- barely perceptible cross-talk, <u>or</u>
- one-way latency between 136 and 175 milliseconds

FIG.3C

GRADE D
- occasional difficulty in speech comprehension, or
- occasional difficulty in transiting real-time fax, or
- noticeable loudness degradation, or
- some perceptible cross-talk, or
- less-than full duplex communications (e.g., one direction of communication is noticeably blocked while the other direction is active), or
- commonly perceptible echo not interfering with interactive conversations, or
- one-way latency exceeding 176 and 200 milliseconds

FIG.3D

GRADE E
- difficulty in speech comprehension, or
- unable to transit real-time fax, or
- significant loudness degradation, or
- perceptible cross-talk, or
- virtually half-duplex communications (e.g., one direction of communication is significantly blocked while the other direction is active), or
- commonly perceptible echo interfering with interactive conversations, or
- one-way latency exceeding 201 milliseconds

FIG.3E

| SELLER INPUT TEMPLATE | | 401 |
|---|---|---|
| CARRIER NAME: | ________ | |
| SELLER ID #: | ________ | |
| PASSWORD: | ________ | |
| SUBMITTED: | 7/27/99 | |

| SPECIFICATIONS: | |
|---|---|
| ORIGINATING LOCATION: | ________ |
| TERMINATION LOCATION: | ________ |
| PRICE: | ________ |
| CAPACITY: | ________ |
| NUMBER OF CIRCUITS: | ________ |
| TIME AVAILABLE: | ________ |
| GRADE (IF KNOWN): | ________ |
|    IF NOT KNOWN: | [CLICK HERE] — 470 |
| SPECIAL FACTORS: | [CLICK HERE] |

FIG.4A

| SELLER INPUT TEMPLATE | | 415 |
|---|---|---|
| CARRIER NAME: | ________ | |
| BUYER ID #: | ________ | |
| PASSWORD: | ________ | |
| SUBMITTED: | 7/27/99 | |

| SPECIFICATIONS: | |
|---|---|
| ORIGINATING LOCATION: | ________ |
| TERMINATION LOCATION: | ________ |
| PRICE: | ________ |
| CAPACITY: | ________ |
| NUMBER OF CIRCUITS: | ________ |
| TIME REQUESTING: | ________ |
| GRADE (IF KNOWN): | ________ |
|    IF NOT KNOWN: | [CLICK HERE] — 472 |
| SPECIAL FACTORS: | [CLICK HERE] |

FIG.4B

| SELLER INPUT TEMPLATE | |
|---|---|
| CARRIER NAME: | USAGLOBAL |
| SELLER ID #: | SC300M3A4 |
| PASSWORD: | *******' |
| SUBMITTED: | 7/27/99 |
| SPECIFICATIONS: | |
|   ORIGINATING LOCATION: | NEW YORK |
|   TERMINATION LOCATION: | LONDON |
|   PRICE: | $5k/month |
|   CAPACITY: | 120k min/month |
|   NUMBER OF CIRCUITS: | 200 |
|   TIME AVAILABLE: | 8/1/1999 to 1/2000 |
|   SPECIAL FACTORS: | [CLICK HERE] |
| PARAMETER INPUTS: | |
|   TYPE OF CONNECTION | ———— |
|   VOICE COMPRESSION RATIO | ———— |
|   SPEECH CLARITY | ———— |
|   LOUDNESS DEGRADATION | ———— |
|   NOISE | ———— |
|   CROSS-TALK | ———— |
|   DUPLEX CAPABILITY/ECHO LEVEL | ———— |
|   ONE-WAY LATENCY | ———— |

FIG.5A

| BUYER INPUT TEMPLATE | |
|---|---|
| CARRIER NAME: | EUROGLOBAL |
| SELLER ID #: | BC620Z3A6 |
| PASSWORD: | ****** |
| SUBMITTED: | 7/29/99 |
| SPECIFICATIONS: | |
|   ORIGINATING LOCATION: | NEW YORK |
|   TERMINATION LOCATION: | LONDON |
|   PRICE: | $10k/month |
|   CAPACITY: | 100k min/month |
|   NUMBER OF CIRCUITS: | 100 |
|   TIME REQUESTING: | 8/1/1999 to 12/1/1999 |
|   SPECIAL WEIGHING FACTORS: | [CLICK HERE] |
| PARAMETER INPUTS: | |
|   TYPE OF CONNECTION | ________ |
|   VOICE COMPRESSION RATIO | ________ |
|   SPEECH CLARITY | ________ |
|   LOUDNESS DEGRADATION | ________ |
|   NOISE | ________ |
|   CROSS-TALK | ________ |
|   DUPLEX CAPABILITY/ECHO LEVEL | ________ |
|   ONE-WAY LATENCY | ________ |

- GRADE* OF USAGLOBAL AT 5/99-1975: B
- GRADE* OF USAGLOBAL AT 7/99: C
- GRADE* OF USAGLOBAL AT 9/99: E

*:WITH OTHER PARAMETERS HELD AT SAME VALUE

ASSIGNING TELECOMMUNICATIONS SERVICES TO MATCHABLE CLASSES

This is a continuation-in-part of U.S. patent application Ser. No. 09/213,703, filed Dec. 17, 1998, now U.S. Pat. No. 6,144,727, which is a continuation-in-part of U.S. patent application Ser. No. 09/129,413, filed Aug. 5, 1998, now U.S. Pat. No. 6,226,365, and U.S. patent application Ser. No. 08/927,443, filed Sep. 11, 1997, now U.S. Pat. No. 6,005,926, which is a continuation-in-part of U.S. patent application Ser. No. 08/920,567, filed Aug. 29, 1997 now abandoned, all of which are hereby incorporated by reference.

FIELD OF THE INVENTION

The invention relates to a system and method for buying and selling telecommunications services. More specifically, the invention relates to a system and method that automatically matches buy and sell orders by assigning pluralities of services with similar characteristics to classes of telecommunications services.

BACKGROUND OF THE INVENTION

Before the deregulation of international communication services, carriers interconnected their networks based on bilateral agreements and associated accounting rates. Deregulation, however, has spawned intense competition, sending carriers scrambling to reduce their costs to stay competitive. Thus, carriers are constantly searching for new, cheaper routes with specific characteristics. Carriers strike new bilateral agreements at an accelerating rate, each with its own service level agreement and accounting rates. At the same time and for the same reasons, the useful lifespan of these agreements is shortened as each carrier continues to look for (and find) better deals.

As described in co-pending application Ser. No. 09/213,703, which is hereby incorporated by reference in its entirety, many of the problems arising from this bilateral agreement model may be overcome by adopting an exchange model for the trading of telecommunications services. The exchange model connects the networks of multiple carriers through a limited number of interconnection nodes, permitting carriers to seek, find, and interconnect to better-priced networks without requiring new agreements and interconnections. Each carrier needs to reach only one agreement with the operator of such an exchange to enable interconnection with any other carrier so connected.

Since the exchange model requires contractual agreements between each participating carrier and the exchange operator, it is important that the agreement be standardized so that it has uniform meaning among all participating carriers, and can provide a feasible basis for trading communication services.

But such contracts characterize services using a large variety of possible parameters, many of which may take on any one of a plurality of values. Examples of such parameters are origin and destination, quantity, type of service (e.g., circuit-switched voice, fax, data, video, messaging services, voice mail, e-mail, paging, universal mailbox), transmission technology employed e.g., ISDN, ATM), coding technology used (e.g., voice codecs, data compression techniques), signaling method used to control the interconnected network (e.g., SS7, H.323), voice quality of service (VQoS), reliability, security of transmission, post dial delay (PDD), answer seizure ratio (ASR), price, and the term of each agreement (beginning, ending).

When contracts are negotiated on a custom basis (as is the case with bilateral agreements), matching the characteristics of services required with those of services offered is the subject of negotiations between the parties and is addressed in the final agreement. In the exchange model, however, interconnection remains fixed while contracts may change in quick succession; this requires the automation of negotiations and resulting operational transitions. However, automated matching of required and offered services is often impractical when the number of specifiable parameters and the value assigned to them is large. The number of combinations possible when n parameters are specified and each may acquire m possible values is n to the power of m. The large number of potential combinations of features drastically reduces the probability of matching all the parameters of a service required by a buyer with all the parameters of a service offered by a seller.

The problem is exacerbated by the variability of parameters (such as those associated with quality) over time. Typically, the exchange operator is responsible for monitoring service quality to ensure that it continues to meet the requirements specified by the buyer. In practice, this monitoring may reveal significant deviations between the promised and delivered quality of service. In that event, the exchange operator may swap, in real time, circuits meeting the contracted parameters in place of the ones that violate the contract. When the number of possible combinations of parameters is large, the probability of finding a suitable circuit in real time is small.

SUMMARY OF THE INVENTION

The present invention provides a system and method for assigning services to a relatively small number of tagged classes based on the values of certain parameters characterizing these services. Carriers participating in the exchange may use the class tag to refer to each service they seek to purchase or sell. The relatively small number of classes increases the probability of matching offered and required services. Class definitions may be established on the basis of typical parameter values for a particular type of service, and may be modified over time as those values change.

The exchange operator may monitor the parameter variation of each offered service, and swap that service for a different service when monitored variation exceeds that dictated by class boundaries. The system may employ a hysteresis band of suitable dimensions to ensure that the assignment of offered services to classes is as stable as desired while remaining sensitive to meaningful variations in parameter values.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENT

Figure 1:
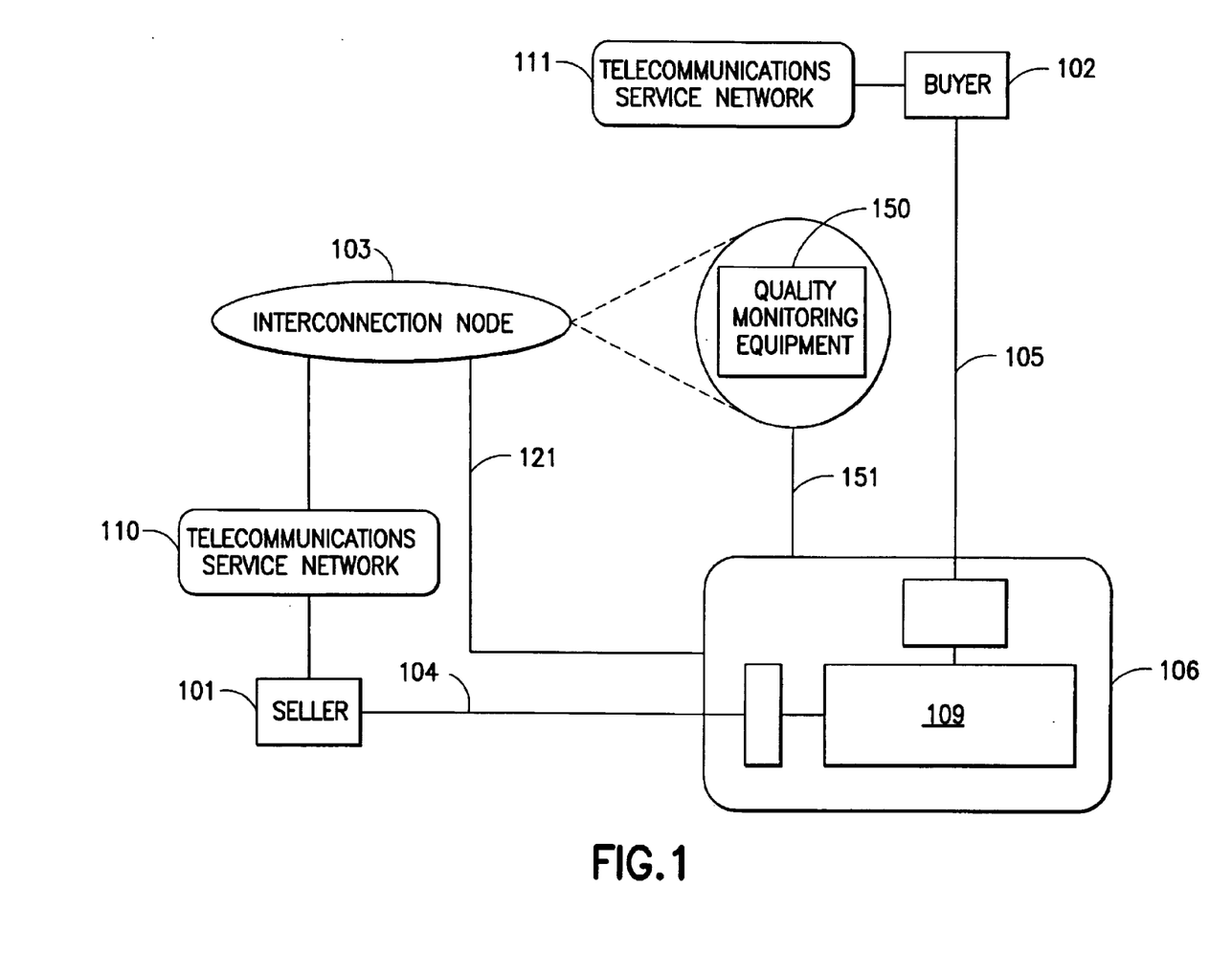
FIG. 1 is a block diagram of a telecommunications sales architecture suitable for implementing the present invention.

FIG. 1 shows a preferred embodiment of a telecommunications sales architecture suitable for implementing the system and method of the present invention. As shown in FIG. 1, seller 101 connects to a telecommunications server node 106 via a communication line 104. Communication line 104 may constitute a Public Switched Telephone Network (PSTN) line, an Internet connection, or any other suitable communication link. In a preferred embodiment, sellers connect to server node 106 via a template 401 which may be accessed at a world-wide-web secure site connected to server node 106. A preferred embodiment of template 401 is described below in connection with FIG. 4A. As is further shown in FIG. 1, a buyer 102 connects to server node 106 via a communication line 105. Communication line 105 may connect via the same or a different network as communication line 104. In a preferred embodiment, buyers connect to server node 106 via a template 415 which may be accessed at the world-wide-web secure site connected to server node 106. A preferred embodiment of template 415 is described below in connection with FIG. 4B.

Server node 106 further comprises a processor 109 that matches offers to sell with offers to buy and brokers transactions of telecommunications services as described in more detail below. The system of FIG. 1 further comprises an interconnection node 103 that serves as an interconnection point between a telecommunications network 110 of seller 101 and a telecommunications network 111 of buyer 102, and enables buyer 102 to use telecommunications services purchased by it through server node 106.

Server node 106 is preferably connected to interconnection node 103 via a communication line 121, and provides that node with instructions for connecting, e.g., telecommunications networks 110, 111. Interconnection node 103 contains quality monitoring equipment 150, which may be connected to server node 106 via a communication line 151. Quality monitoring equipment 150 provides server node 106 with quality updates that enable server node 106 to update as necessary the classes to which particular services are assigned.

Figures 2, 2C:
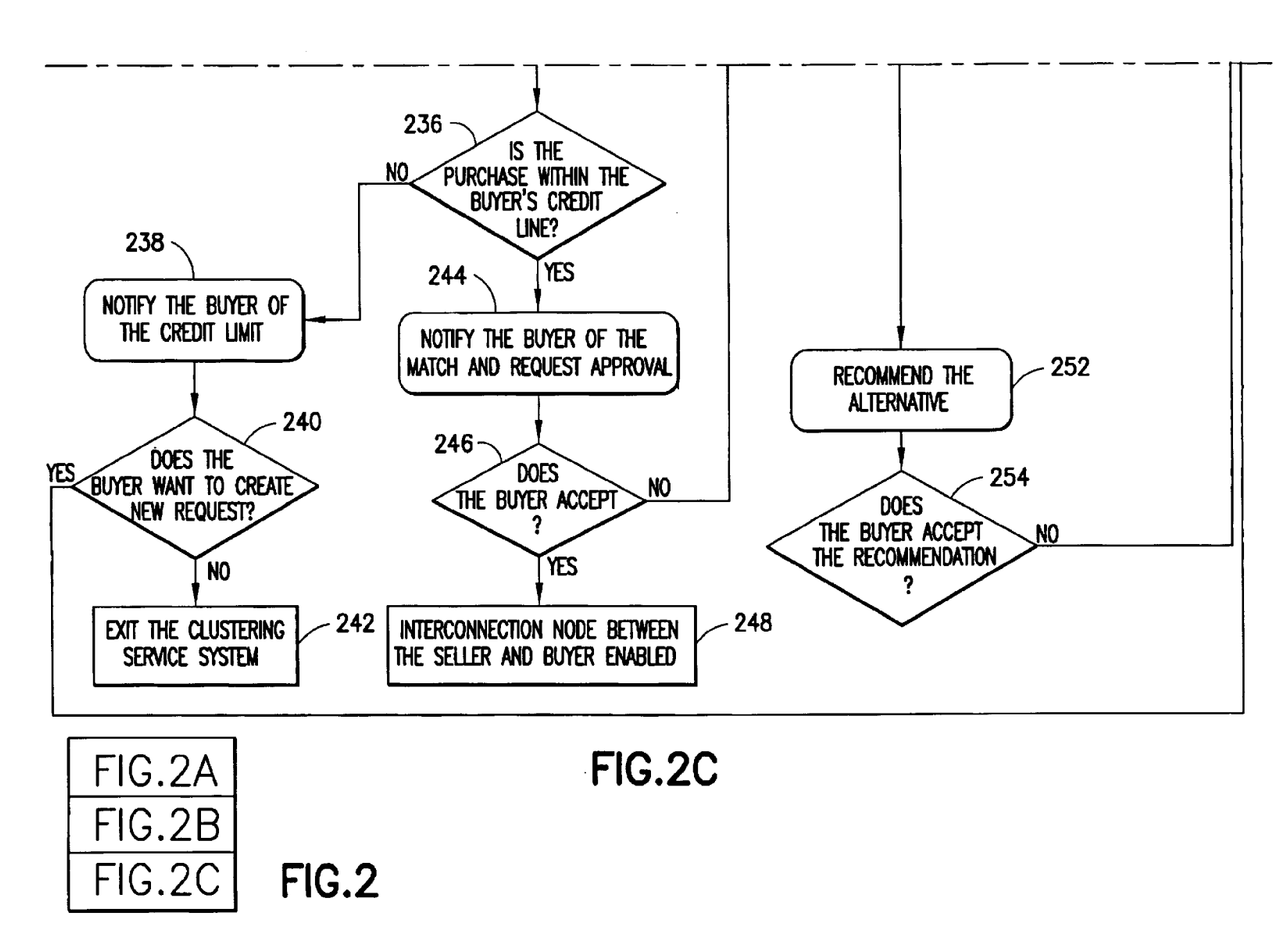
FIG. 2 is a flowchart depicting a preferred embodiment of the system and method of the present invention.
Figure 2A:
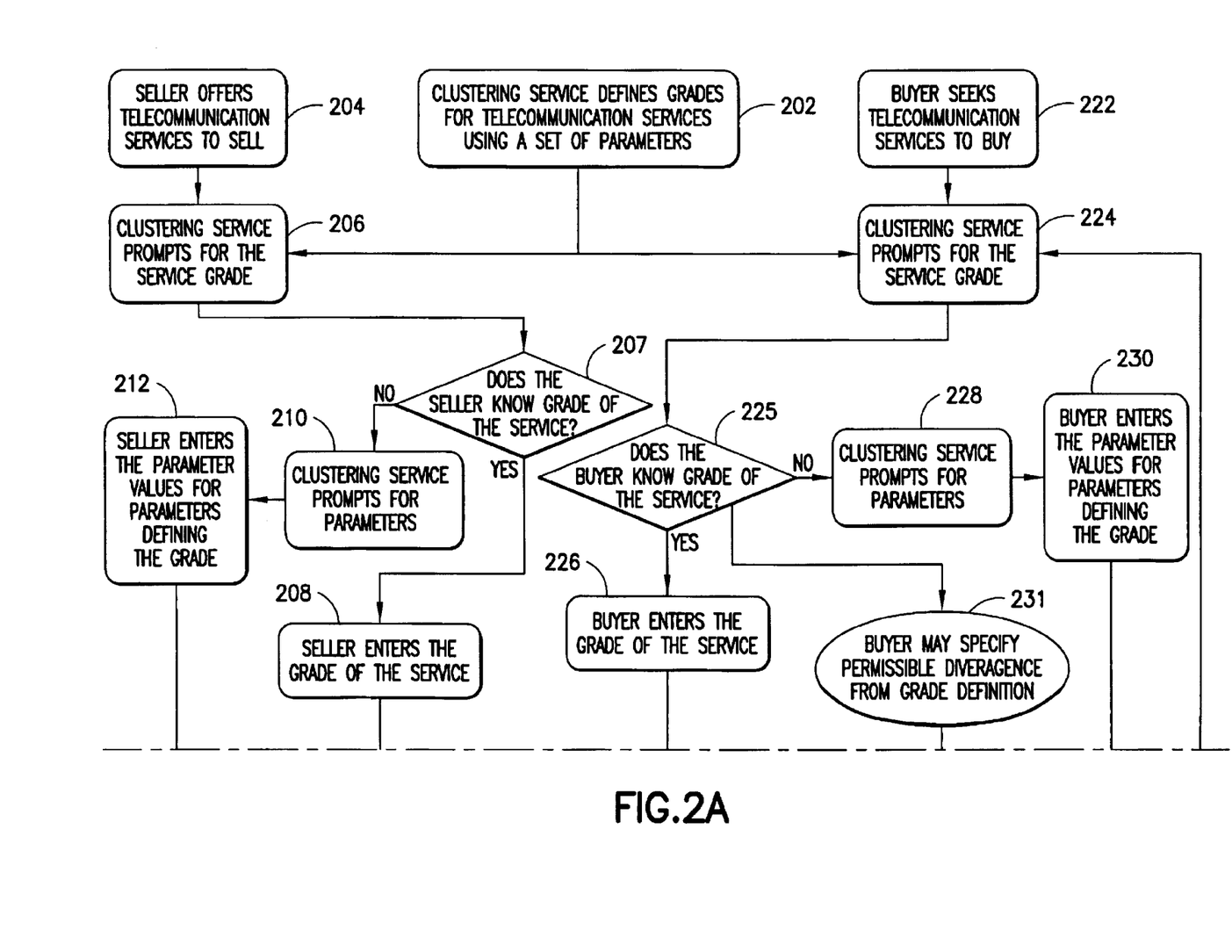
Figure 2B:
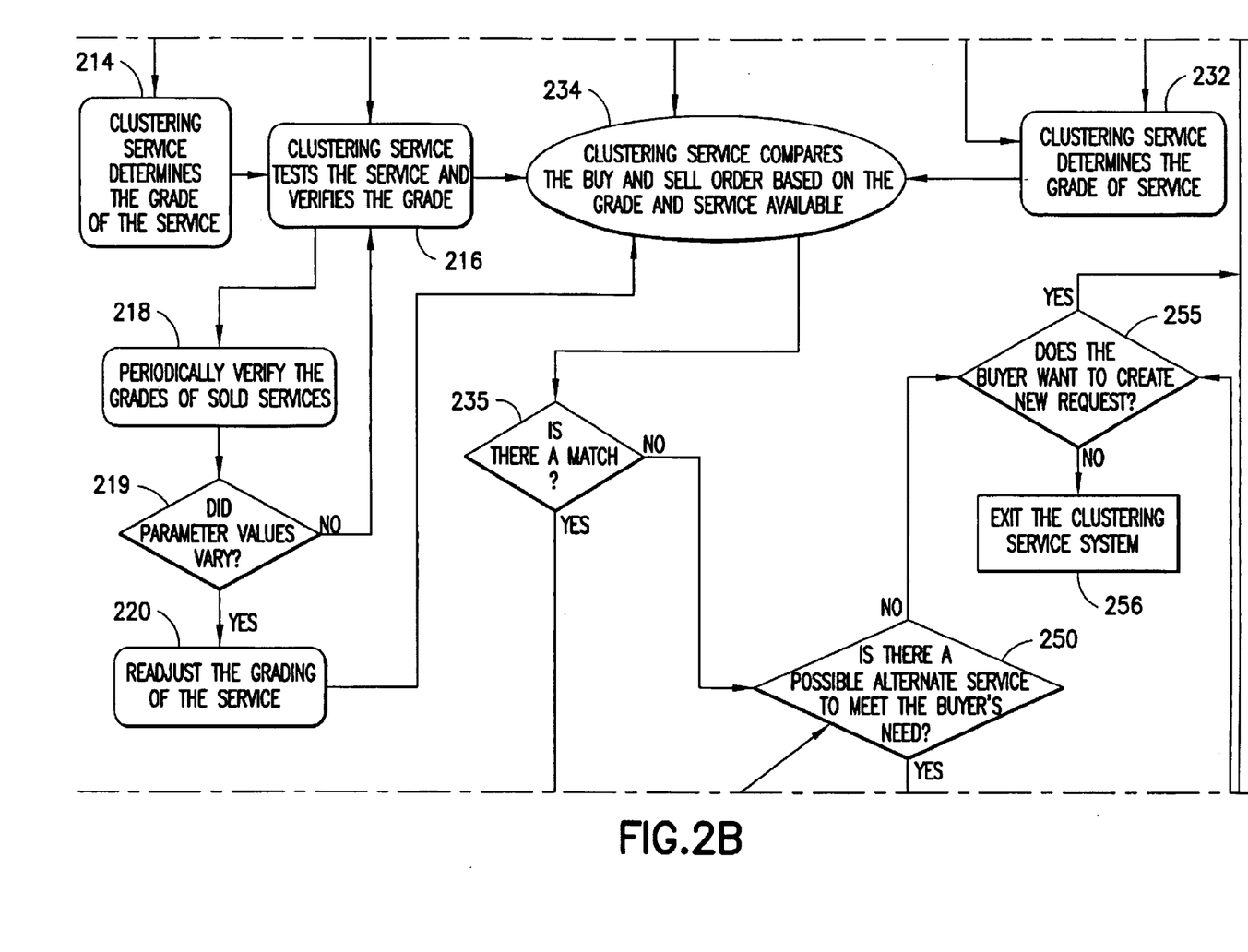
Figure 3A:
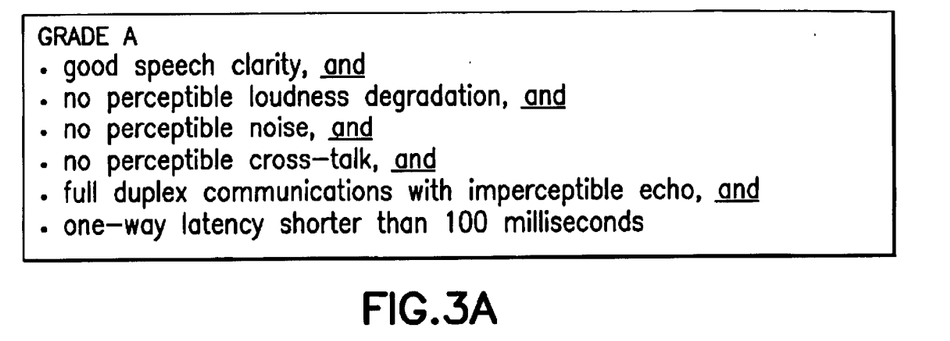
FIGS. 3A–E are tables depicting preferred embodiments of grade definitions of a telecommunications service.

FIG. 2 is a flowchart illustrating a preferred embodiment of the system and method of the present invention. As shown in FIG. 2, at step 202, server node 106 classifies telecommunications services based on parametrically defined class boundaries. Different value ranges for a set of parameters determine the class to which a telecommunications service is assigned. Each class is typically associated with a quality grade which is parametrically defined. One illustrative example of a series of grade definitions is now described in connection with FIGS. 3A–E. As illustrated in FIG. 3A, Grade A may be defined as any service meeting all of the following requirements:

good speech clarity, and no perceptible loudness degradation, and no perceptible noise, and no perceptible cross-talk, and full-duplex communications with imperceptible echo, and one-way latency shorter than 100 milliseconds.

Figure 3B:
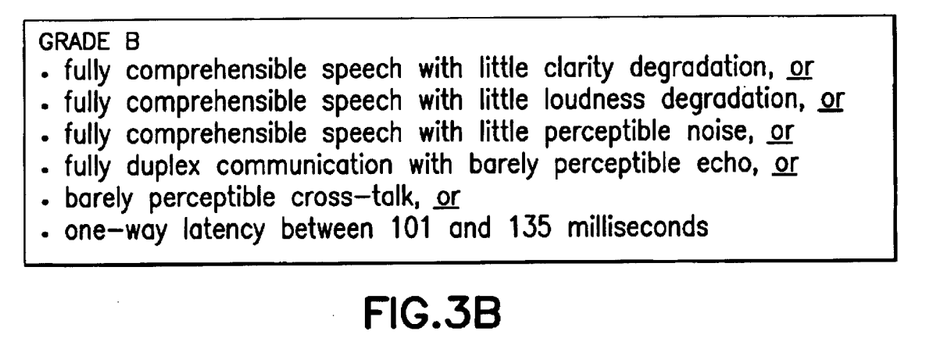

As illustrated in FIG. 3B, Grade B may be defined as service that differs from Grade A service in one or more of the following respects:

fully comprehensible speech with little clarity degradation, or fully comprehensible speech with little loudness degradation, or fully comprehensible speech with little perceptible noise, or full duplex communications with little perceptible echo, or barely perceptible cross-talk, or one-way latency between 101 and 135 milliseconds.

Figure 3C:
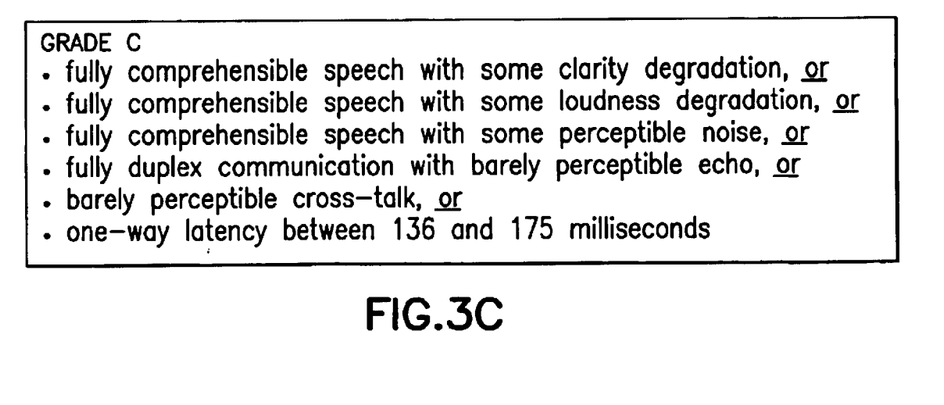

As illustrated in FIG. 3C, Grade C may be defined as service that differs from Grade A service in one or more of the following respects:

fully comprehensible speech with some clarity degradation, or fully comprehensible speech with some loudness degradation, or fully comprehensible speech with some perceptible noise, or full duplex communications with barely perceptible echo, or barely perceptible cross-talk, or one-way latency between 136 and 175 milliseconds.

Figure 3D:
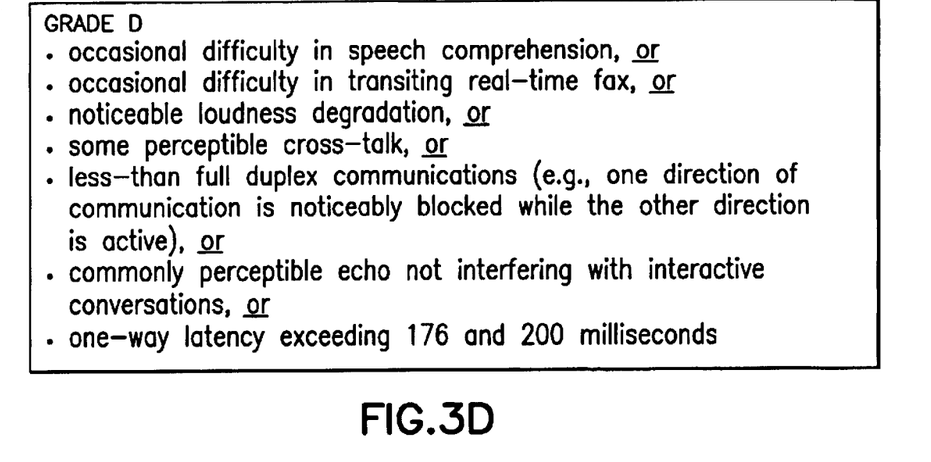

As illustrated in FIG. 3D, Grade D may be defined as service that differs from Grade A service in one or more of the following respects:

occasional difficulty in speech comprehension, or occasional difficulty in transiting real-time fax, or noticeable loudness degradation, or some perceptible cross-talk, or less than full duplex communications (e.g., one direction of communication is noticeably blocked while the other direction is active), or commonly perceptible echo not interfering with interactive conversations, or one-way latency between 176 and 200 milliseconds.

Figure 3E:
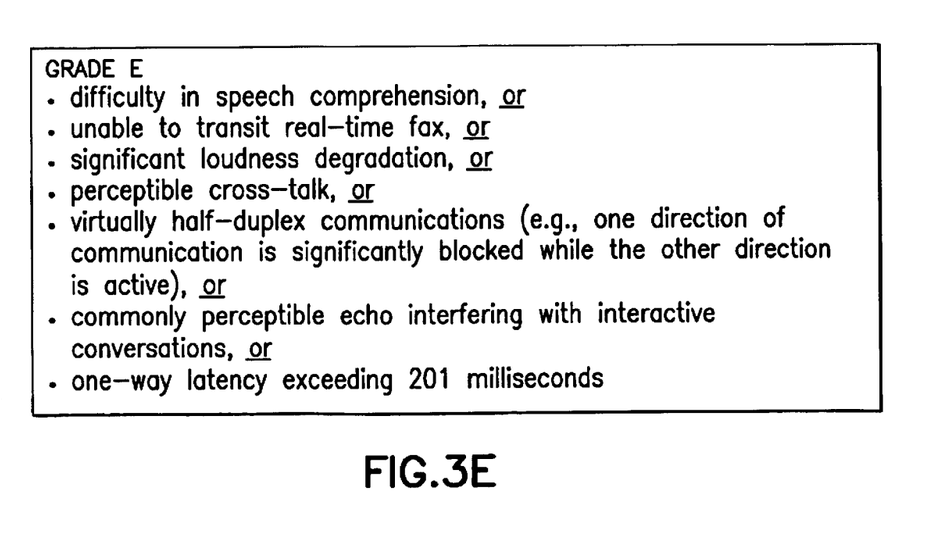

As illustrated in FIG. 3E, Grade E may be defined as service that differs from Grade A service in one or more of the following respects:

difficulty in speech comprehension, or unable to transit real-time fax, or significant loudness degradation, or perceptible cross-talk, or virtually half-duplex communications (e.g., one direction of communication is significantly blocked while the other direction is active), or commonly perceptible echo interfering with interactive conversations, or one-way latency exceeding 201 milliseconds.

Note that subjective terms such as "no perceptible echo" have associated objective, measurable parameters with appropriate reference to commonly understood standards.

Figure 4A:
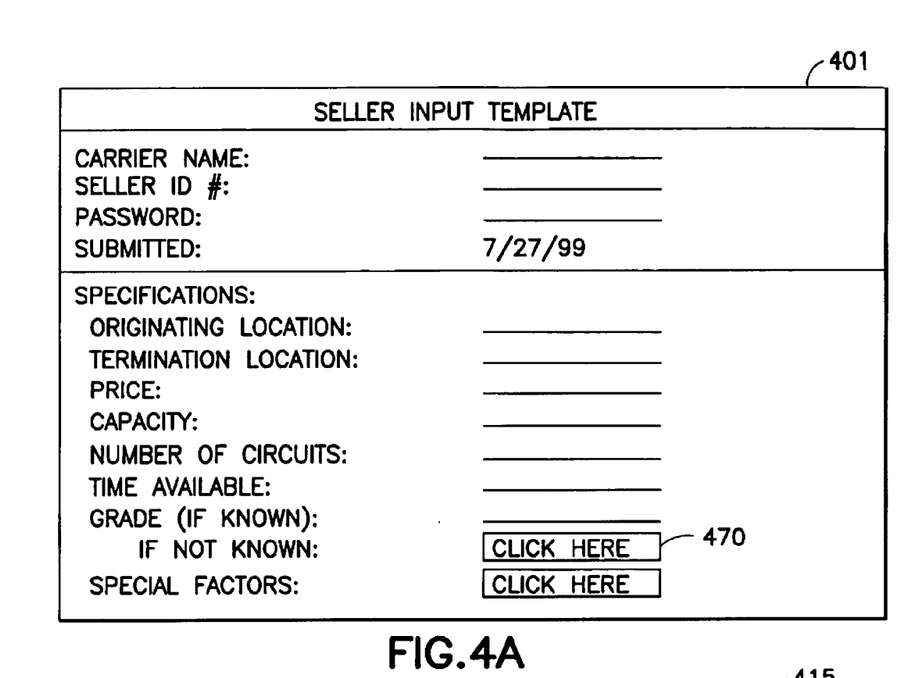
FIGS. 4A–B are tables depicting preferred embodiments of input templates for a seller and a buyer of a telecommunications service.

In step 204, a seller connects to server node 106 preferably via a world-wide-web secure site as described above. In step 206, the seller is prompted to enter information concerning the service it desires to offer, preferably via template 401. As shown in FIG. 4A, template 401 first prompts the seller to enter its name, ID number, and password. The next lines on template 401 prompt the user to enter information concerning the service offered for sale. In the particular example illustrated in FIG. 4A, the user is prompted to enter the originating and terminating locations for the offered service, the seller price, and the capacity, number of circuits, and timeframe for the offered service.

Figure 5A:
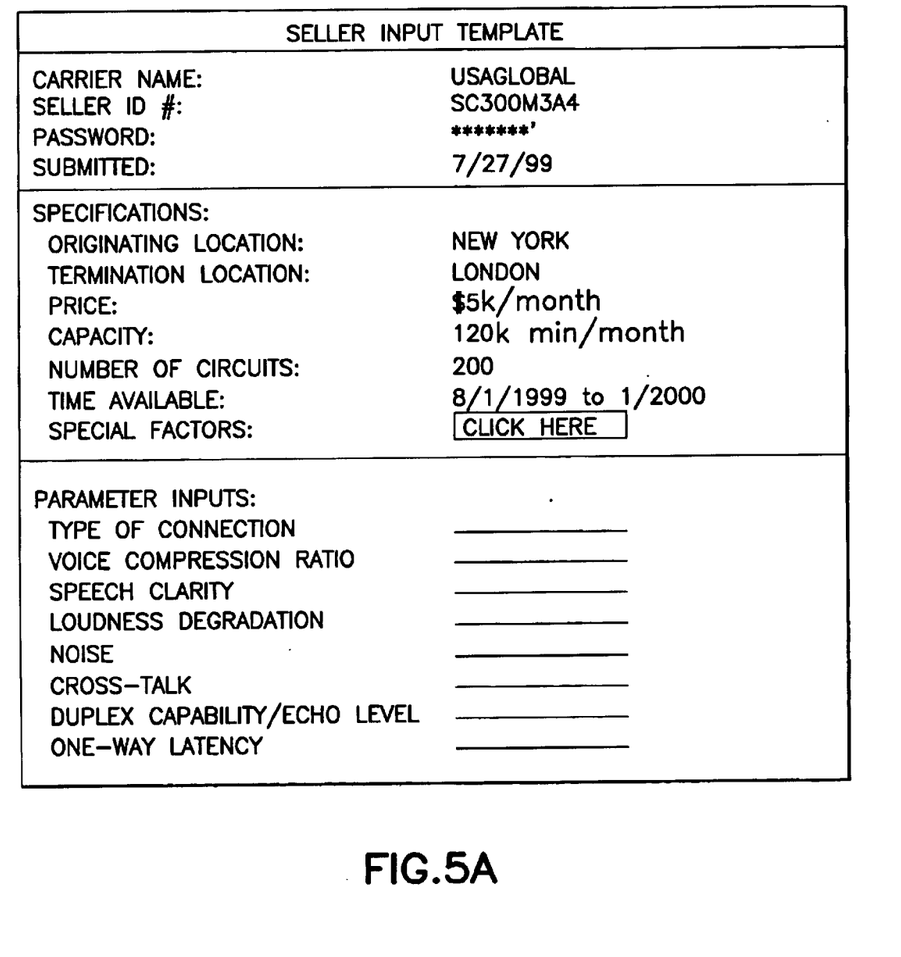
FIGS. 5A–B are tables depicting preferred embodiments of input templates for inputting parameters of a telecommunications service that define the grade.

The next template line prompts the seller to enter the grade of service being offered for sale. If the seller knows the grade of the service it is selling, the seller may enter the grade as shown in step 208. If the seller does not known the grade of the service it wishes to sell (e.g., because it is unfamiliar with the grade definitions), the seller indicates this fact to server node 106 by clicking on icon 470, as illustrated in step 207. In that event, the system proceeds to step 210 and the seller is prompted with a second template to enter specific operational parameters of the service being offered for sale. A preferred embodiment of the second template is shown in FIG. 5A. The parameters elicited from the seller preferably correspond to the parameters used by the system to determine the grade of a particular service. In step 212, the seller enters the parameters specified in the template of FIG. 5A. Then, at step 214, server node 106 determines the service grade using the inputted parameter values.

Once the service grade has been inputted or determined, the system tests the service to verify the grade (step 216). Thereafter, the system periodically tests and verifies the grade of each service that is available for sale in the system (step 218). If any parameter value changes, and if that change is sufficient to require a change in class assignment, the system reclassifies that particular telecommunications service in step 220. Once the classes of the services have been verified, they are available for sale to buyers.

Figure 4B:
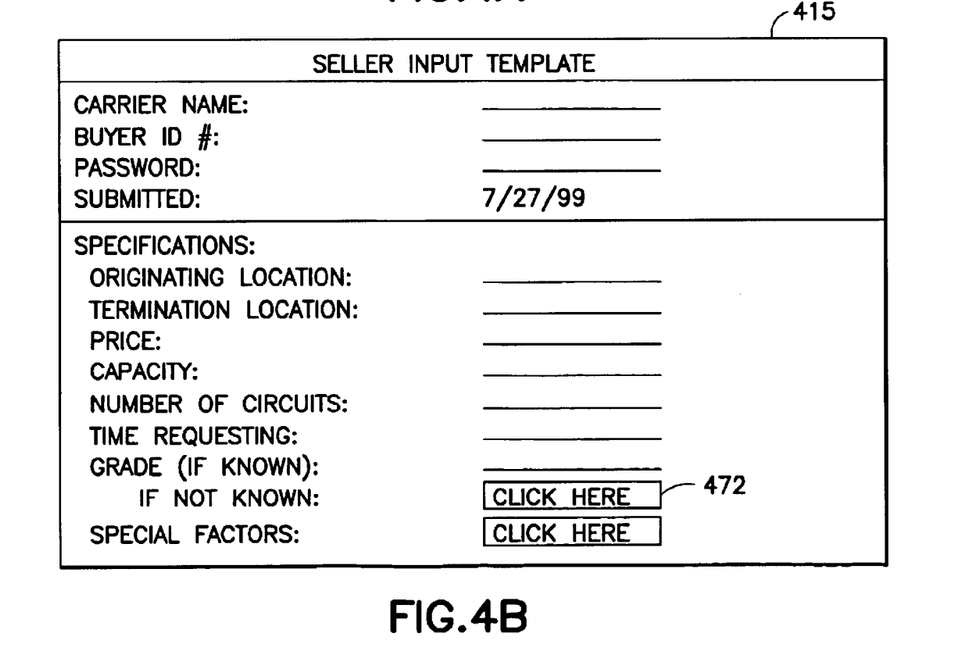

The system also collects information from buyers concerning telecommunications services that they seek to purchase. Thus, in step 222, a buyer connects to server node 106 preferably via a world-wide-web secure site as described above. In step 224, the buyer is prompted to enter information concerning the required service, preferably via template 415. As shown in FIG. 4B, template 415 first prompts the buyer to enter its name, ID number, and password. The next lines on template 415 prompt the buyer to enter information concerning the required service. In the particular example illustrated in FIG. 4B, the template prompts the user to enter the originating and terminating location for the required service, the buyer price, and the capacity, number of circuits, and timeframe for the required service.

The next template line prompts the buyer to enter the grade of service it wishes to purchase. If the buyer knows the grade of service it wishes to purchase, it may enter the grade as shown in step 226. If the buyer does not know the grade it wishes to purchase (e.g., because it is unfamiliar with the grade definitions), it indicates this fact to server node 106 by clicking on icon 472, as illustrated in step 225. In that event, the system proceeds to step 228 and the buyer is prompted by a second template to enter specific operational parameters of the service it wishes to purchase. A preferred embodiment for such a template is shown in FIG. 5B.

Figure 5B:
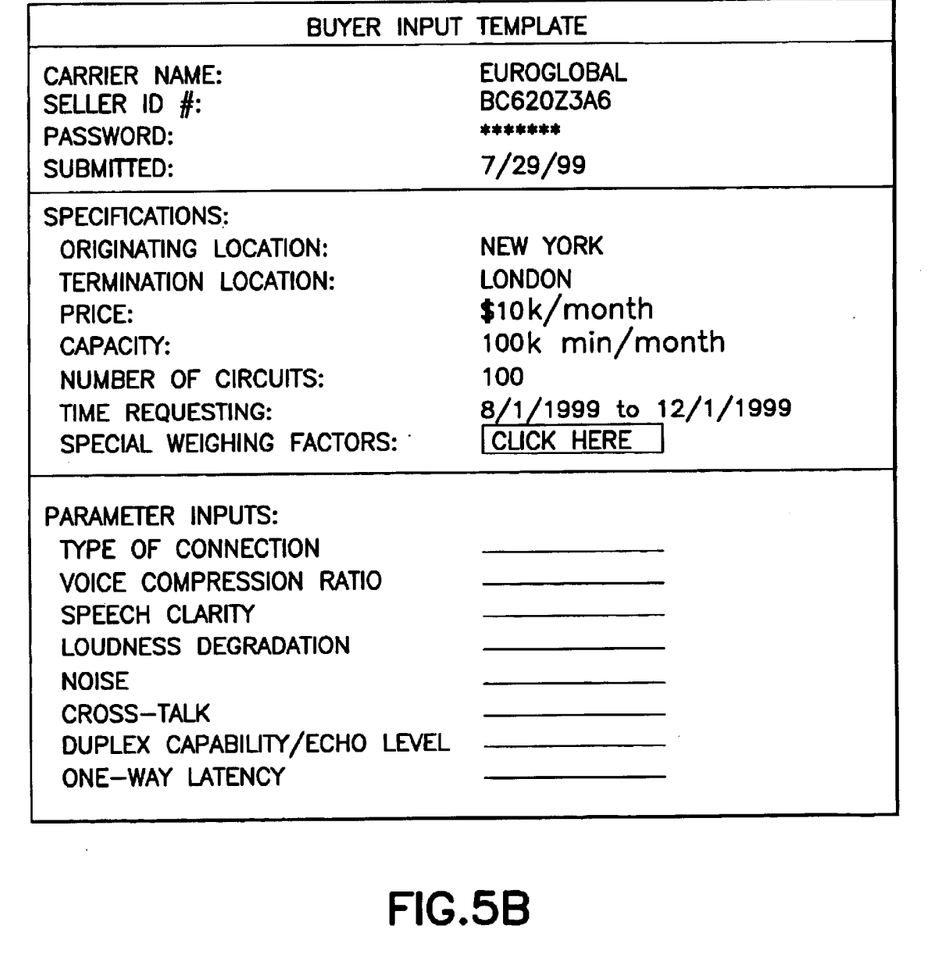

In step 230, the buyer enters the parameters specified in the template of FIG. 5B. The parameters elicited from the buyer preferably correspond to the parameters used by the system to determine the grade of a particular service. Then, at step 232, the system determines the grade of service desired by the buyer on the basis of the inputted parameter values. In a further preferred embodiment, the system may inform the buyer of the determined grade and request approval of the grade from the buyer. In addition, once a grade has been determined for the service request (either by the buyer or the system), the system may inform the buyer of a price at which it will be able to match the buyer's service request with a service offer, and give the buyer the opportunity to enter that price on, for example, template 415.

Thus, the system establishes a plurality of offers to sell and offers to buy telecommunications services each of which is assigned to a particular class of service defined in terms of a predefined range of values for a particular group of service parameters.

The system then brokers transactions of telecommunications services between buyers and sellers. In particular, server node 106 matches buy orders to sell orders. This functionality is represented in step 234. Then, in step 236, server node 106 checks to see if the buy order is within the buyer's credit limit. If the buyer's buy order exceeds the credit limit, server node 106 notifies the buyer of the credit limit, as illustrated in step 238. The buyer may choose to create a new buy order. In that event, the buyer is returned to step 224 where it can enter a new service request. If the buyer does not want to create a new service request, the buyer exits the system in step 242. If the buyer's buy order does not exceed the buyer's credit limit, then, in a preferred embodiment, the system may request approval from the buyer before executing the transaction (step 244). At step 246, the buyer decides whether or not it wishes to accept the proposed transaction. If the buyer accepts, server node 106 brokers the transaction between the parties transferring the subject telecommunications services from the seller to the buyer. Alternatively, the system may conduct an open- or closed-bid auction in which all sellers offering a particular grade of service bid for the right to sell service to a buyer. At step 248, one or more interconnection nodes between the seller and the buyer are enabled to permit the buyer to utilize the purchased telecommunications services.

It should be noted that although in the preferred embodiment shown in FIG. 1 both the buyer and the seller are telecommunications carriers, telecommunications services may also be bought and sold via server node 106 by other entities who are not telecommunications carriers for purpose of investment or speculation.

In a further preferred embodiment, the system may assign a plurality of services to classes. Each class preferably comprises a plurality of service offers of like grade. When an offer to buy telecommunications service is received, the system may allocate service from a matching class to fill the request, without specifying at the time of the transaction the particular service provider that will be used to provide the desired telecommunications service. When the buyer wishes to utilize the purchased service to, for example, connect a voice telephone call, the system identifies a particular service provider in the class to handle the call, and enables an interconnection node between that service provider and the buyer to permit the buyer to connect the call via the service provider's network or other facilities. The choice of service provider may be based on one or more factors, such as price or availability of circuits.

If no match is identified in step 234, server node 106 searches for an alternative service for the buyer's need in step 250. If there is an alternative, this alternative is recommended in step 252. The buyer may accept the recommendation in step 254. If the buyer rejects the recommendation, the buyer may choose to create a new service request. In that event, the buyer is returned to step 224 where it can enter a new service request. If the buyer does not want to create a new service request, the buyer exits the system in step 256.

In a preferred embodiment, the system may define service grades based on conditions normally expected for a particular telecommunications service. Assume, for example, that ASR value is one of multiple parameters used to characterize service grade. If, for example, the median ASR value from New York to London is 70%, the system might designate ASR>70% to constitute grade B service, and then define an ASR requirement for each other defined grade relative to that of grade B. For example, with respect to routes connecting New York and London, the system might define the ASR requirement to belong to a particular service grade as:

| | |
|---|---|
| Grade A: | ASR > 85% |
| Grade B: | 84% > ASR > 70% |
| Grade C: | 69% > ASR > 55% |
| Grade D: | 45% > ASR > 40% |
| Grade E: | 39% > ASR > 25% |

In contrast, assume that the median ASR value for calls from New York to California is 85%. The system might then define the ASR requirements for telecommunications services connecting those two locations as:

| | |
|---|---|
| Grade A: | ASR > 95% |
| Grade B: | 94% > ASR > 85% |
| Grade C: | 84% > ASR > 70% |
| Grade D: | 69% > ASR > 55% |
| Grade E: | 54% > ASR > 40% |

Information concerning ASR and other parameters may be taken from industry indexes published by recognized bodies such as the ITU-T. Alternatively, parameter information may be independently derived by the exchange operator. The exchange operator may define its own grade definitions, or alternatively may adopt definitions created by others. Although the above example employs the median value, other measures such as the average may alternatively be employed.

As a matter or notation, it may also be useful to specify service quality in relation to the above-mentioned industry indexes. For example, if telecommunications service from New York to Buenos Aires typically exhibits ASR of 45%, PDD (post dial delay) of 12 seconds, and CCI (call clarity index) of 3, then a service on that route with an ASR of 50%, a PDD of 10 seconds, and a CCI of 4 may be represented as: ASR+5, PPD−2, and CCI+1.

Similarly, the quality of particular services may be described in relation to service grades defined by server node 106. Continuing with the above example, if grade D service from New York to Buenos Aires is defined by the parameters: ASR greater than 35%; PDD greater than 18 seconds; and CCI greater than 2, then the above described service may be defined relative to grade D as: ASR+15, PPD−8, and CCI+2.

Figure 6A:
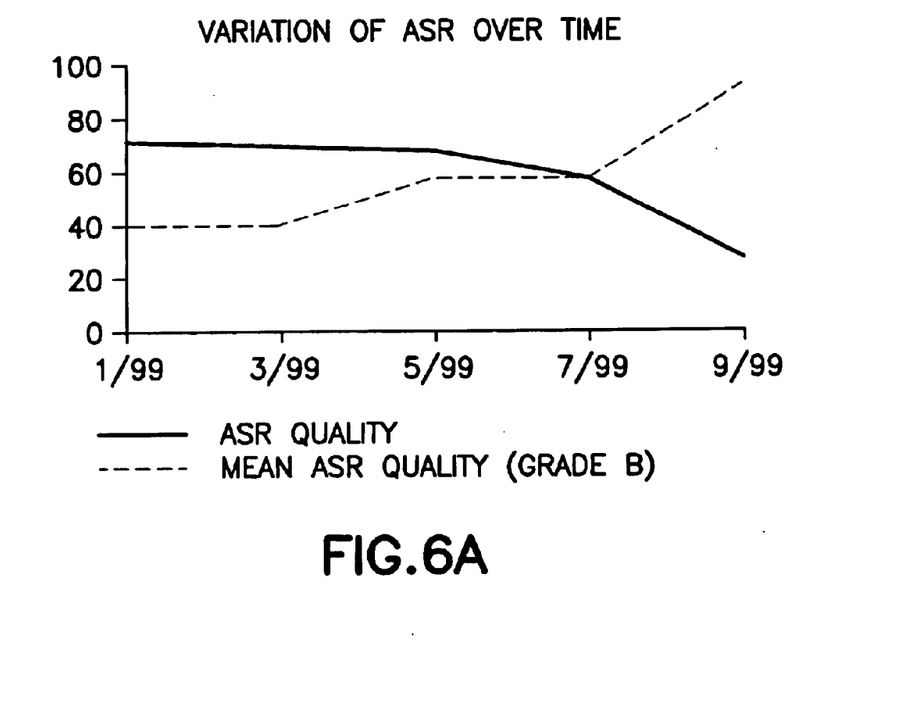
FIG. 6A is a graph illustrating an example of grade change as a function of a variation in parameter value over time.
Figure 6B:
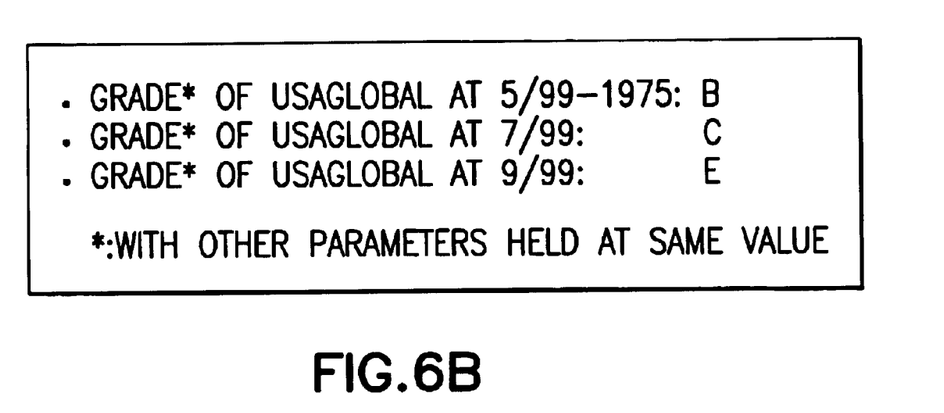
FIG. 6B is a table illustrating an example of grade change as a function of a variation in parameter value.

In a further preferred embodiment, the system may change the grade definitions for a class of telecommunications services as the values for particular parameters on those services change over time. Thus, for example, as illustrated in FIGS. 6A–B, if the median call quality between New York and London improves, the definition for grade B service (and accordingly for grades A and C–E) may be modified to reflect the new standard. As a result, services that fail to improve their call quality may drop to a class with lower grade characteristics.

Furthermore, server node 106 may preferably monitor real-time quality variation of offered services, and adaptively swap the assignment of offered services when monitored variation in one or more parameter values exceeds that prescribed by class boundaries. In a preferred embodiment, the service may be swapped for another service from the appropriate class of service offers characterized by the same grade of service, as described above. Penalties may be assessed against a seller if it becomes necessary to substitute another service for the seller's service.

In a preferred embodiment, the system uses a hysteresis band of suitable dimensions to ensure that swapping of offered services among grades is as stable as desired while remaining sensitive to meaningful variations in measured parameters.

Figure 7:
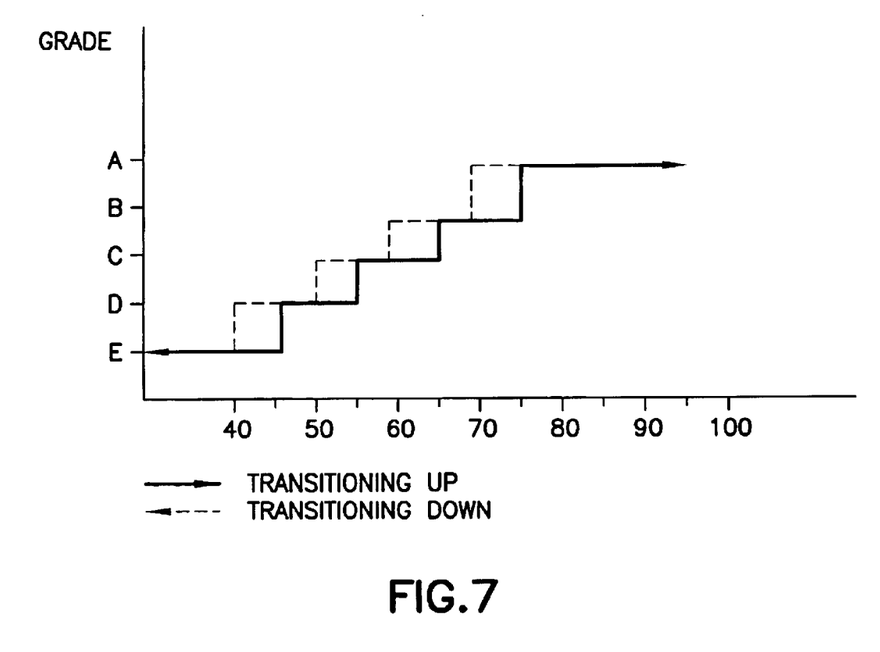
FIG. 7 is a graph illustrating an example using a hysteresis band in grade change.

This preferred embodiment may be demonstrated with the aid of FIG. 7. Assume that ASR greater than 65% characterizes a service from New York to London as Grade B. Also assume that the exchange operator defines a hysteresis band of 5% for ASR. When the measured smoothed average ASR for grade B service drops below 60%, the service is reassigned from Grade b to Grade C. Once in Grade C, the service cannot transition back to Grade B unless the measured smoothed ASR value exceeds 65%. The hysteresis band assures that the assignment of services to classes is stable. Without such a band, ASR fluctuations between, for example, 66% and 64% would result in frequent reassignment of the service from grade B to grade C, and back again.

In a further preferred embodiment, the system may permit carriers to specify the weight assigned to specific parameters for characterizing required services. In this case, the matching of required services to offered services is to a larger degree subjective (dependent on the needs of the carrier requiring the service) and less objective (where all carriers view matching grades in exactly the same terms). Note that these weights may be used in the actual classification of service requests, or alternatively in the process of matching required services with offered services.

For example, a carrier may specify that parameters associated with voice quality of service (e.g., CCI) are more important to it than Post-Dial Delay. When specifying a desired service, this carrier may choose to permit matching 'Best' (Grade A) services with poorer PDD characteristics. The carrier may indicate this by specifying importance factors; for example, a CCI importance factor of 60% and an ASR importance factor of 10%. Alternatively, a carrier may specify a CCI variability of 0 classes, and a PDD variability of 1 class. Alternatively, a carrier may specify PDD variability as Grade A+10 (seconds). In this further preferred embodiment, the system may fill the service request with a service offer that meets the class definition as modified by the parameter variances acceptable to the buyer.

In a further preferred embodiment, price may optionally be included as a parameter whose value is used in assigning services into classes. This becomes especially useful for producing securitized, tradable commodities of communications service contracts.

In a further preferred embodiment, rather than assigning services to pre-defined classes, the system may cluster services (defined through their parameter values) so as to derive the number of classes, associated class boundaries, and service assignments that would maximize a particular objective function of the telecommunications matching system. For example, it may be desirable to define the grade definitions so as to maximize the number of matched services between buyers and sellers. Alternatively, it may be desirable to maximize the value (i.e., price times volume) of the aggregate of all transactions matched by the system. In addition, under some circumstances, it may be desirable to specify the number of clusters or minimize the number of resulting unmatched services.

In this preferred embodiment, a plurality of raw service parameters (e.g., ASR, PDD) are used to define the universe of services requiring matching. The system clusters these services in accordance with the objective function and the relative distances of parameters characterizing these services. The resulting clusters and the services that form them become the definition of the resulting classes and their members.

Clustering of parameters may be achieved in several ways such as by hierarchical cluster analysis. Hierarchical cluster analysis is a statistical method for finding relatively homogenous groups of cases based on measured characteristics. The analysis starts with each parameter in a separate cluster and then combines the clusters sequentially, reducing the number of clusters at each step until only one cluster is left. When there are N parameters, this involves N−1 clustering steps or fusions. This hierarchical clustering process can be represented as a tree, where each step in the clustering process is illustrated by a fork in the tree. Cluster software suitable for implementing hierarchical cluster analysis is available from, for example, Clustan Ltd., of Edinburgh, U.K.

While particular classes and features have been explained above, the class definitions and features are examples and not limiting. Different classifications using different parameters may alternatively be chosen. While the invention has been described in conjunction with specific embodiments, it is evident that numerous alternatives, modifications, and variations will be apparent to those skilled in the art in light of the foregoing description. In particular, although the foregoing description has focused on parameters relating primarily to voice telecommunications, the principles of the present invention apply to other types of telecommunications, such as data and multimedia.

What is claimed is:

1. A method of trading telecommunications services, comprising:
   identifying at least one parameter;
   specifying for that parameter a plurality of values, each value associated with a particular class of service;
   receiving from a seller an offer to sell a telecommunications service;
   assigning the offered telecommunications service to a class on the basis of the asserted value of that parameter in the offered telecommunications service;
   receiving from a buyer an offer to purchase a required telecommunications service;
   assigning the required telecommunications service to a class;
   matching the offer to sell to the offer to buy when the offered telecommunications service is the same class as the required telecommunications service;
   brokering a transaction that effects a transfer of ownership of the offered telecommunications service from the seller to the buyer.

2. The method of claim 1 wherein the offered telecommunications service is assigned to a class by the seller.

3. The method of claim 1 wherein the offered telecommunications service is assigned to a class by the entity that brokers the transaction between the seller and the buyer.

4. The method of claim 1 wherein the required telecommunication service is assigned to a class by the buyer.

5. The method of claim 1 wherein the required telecommunication service is assigned to a class by the entity that brokers the transaction between the seller and the buyer.

6. The method of claim 1 wherein at least one of the values specified for the parameter is a function of a median value for the parameter for a class of telecommunications services including the offered telecommunications service.

7. The method of claim 6 wherein at least one value is modified over time as the median value for the parameter changes.

8. The method of claim 1, further comprising:
   monitoring the quality of the service provided by the seller; and
   reassigning the offered telecommunications service to a different class if the quality of service provided by the seller improves or degrades.

9. The method of claim 8, wherein the service offer is reassigned only if the quality of service changes more than a predetermined amount.

10. The method of claim 8, stabilizing the reassignment of service offers using a hysteresis band.

11. The method of claim 1, further comprising:
    monitoring the typical quality of service provided for the class; and
    reassigning the offered telecommunications service to a different class if the quality of service provided by the seller improves or degrades relative to the typical quality of service provided for the class.

12. A method of providing a telecommunications sale comprising the steps of:
    defining classes for telecommunications services;
    acquiring from a buyer and a seller sell and purchase orders for telecommunications services;
    verifying the seller's telecommunications service parameters;
    storing the sell and purchase orders electronically;
    pooling sellers' telecommunications services based on the grade of telecommunications service;
    automatically identifying a seller's telecommunications service that satisfies the buyer's telecommunications service purchase order based on the sell and purchase orders;
    and enabling interconnection node or nodes between the seller and the buyer according to a pre-determined bilateral agreement.

13. The method of claim 12 wherein the step of defining classes includes choosing a set of class parameters and the values for the parameters.

14. The method of claim 12 wherein the step of defining grades includes specifying weighting factors for the grade parameters.

15. The method of claim 12 wherein the step of acquiring includes a seller and a buyer inputting sell and purchase orders into input templates on a secure network site.

16. The method of claim 15 wherein the step of inputting sell and purchase orders includes inputting the grade, capacity, route, price and the number of circuits information of the telecommunications service.

17. The method of claim 15 further comprising the step of determining the grade of a telecommunications service from the parameter values inputted.

18. The method of claim 12 wherein the step of verifying includes periodically verifying the classes of the telecommunications services available for sale.

19. The method of claim 18 further comprising the step of changing the class of a telecommunications service based on changed parameter values.

20. The method of claim 12 wherein the step of verifying includes periodically verifying the classes of telecommunications service being used by a buyer.

21. The method of claim 20 further comprising the step of changing the class of a telecommunications service based on changed parameter values.

22. The method of claim 21 further comprising the step of assessing a penalty against a seller if its service is reassigned to a lower class.

23. The method of claim 12 further comprising the step of recommending an alternate telecommunications service to satisfy the buyer's purchase order.

24. The method of claim 12 further comprising a buyer inputting a second purchase order when no match is identified for the buyer's first purchase order.

25. The method of claim 12 wherein the step of identifying a seller's telecommunications service includes comparing the purchase order to services assigned to a class that satisfy the purchase order.

26. The method of claim 12 wherein the step of identifying a seller's telecommunications service includes selecting a sell order from a class that satisfies the purchase order.

27. The method of claim 12 wherein the step of identifying a seller's telecommunications service includes replacing a selected sell order with another sell order to satisfy the purchase order during an active use of telecommunications service that was the subject of the selected sell order.

28. A method of trading telecommunication services, comprising:
   identifying at least one parameter;
   specifying for that parameter a plurality of values, each value associated with a particular class of service;
   receiving by a server node from a seller an offer to sell a telecommunications service;
   assigning by the server node the offered telecommunications service to a class on the basis of the asserted value of that parameter in the offered telecommunications service;
   receiving by the server node from a buyer a request to buy a telecommunications service;
   assigning the requested telecommunications service to a class;
   matching by the server node the offer to sell to the request to buy when the offered telecommunications service is of the same class as the requested telecommunications service;
   brokering a transaction that effects a transfer of the offered telecommunications service from the seller to the buyer.

29. The method of claim 28, wherein the offered telecommunication service is assigned to a class by the seller.

30. The method of claim 28, wherein the offered telecommunication service is assigned to a class by the server node.

31. The method of claim 28, wherein the requested telecommunication service is assigned to a class by the buyer.

32. The method of claim 28, wherein the requested telecommunication service is assigned to a class by the server node.

33. The method of claim 28, wherein at least one of the values specified for the parameter is a function of a median value for the parameter for a class of telecommunications services including the offered telecommunications service.

34. The method of claim 33, wherein the at least one value is modified over time as the median value for the parameter changes.

35. The method of claim 28, further comprising:
   monitoring the quality of service provided by the seller; and
   reassigning the offered telecommunications service to a different class if the quality of service provided by the seller improves or degrades.

36. The method of claim 35, wherein the service offer is reassigned only if the quality of service changes more than a predetermined amount.

37. The method of claim 35, stabilizing the reassignment of service offers using a hysteresis band.

38. The method of claim 28, further comprising:
   monitoring the typical quality of service provided for the class; and
   reassigning the offered telecommunications service to a different class if the quality of service provided by the seller improves or degrades relative to the typical quality of service provided for the class.

39. A method of providing a telecommunications sale comprising the steps of:
   defining classes for telecommunications services:
   receiving by a server node from a buyer and a seller sell and purchase orders for telecommunications services;
   verifying by the server node the seller's telecommunications service parameters;
   storing by the server node the sell and purchase orders;
   classifying by the server node sellers' telecommunications services based on the grade of telecommunications service;
   identifying by the server node a seller's telecommunications service that satisfies the buyer's telecommunications service purchase order including grade of telecommunication service requirement based on the sell and purchase orders; and
   enabling by the server node one or more interconnection nodes between the seller and the buyer according to a pre-determined bilateral agreement.

40. The method of claim 39, wherein the step of defining classes includes choosing a set of class parameters and values for the parameters.

41. The method of claim 39, wherein the step of defining grades includes specifying weighting factors for the grade parameters.

42. The method of claim 39, wherein the step of receiving includes a seller and a buyer inputting sell and purchase orders into input templates on a secure network site.

43. The method of claim 42, wherein the step of inputting sell and purchase orders includes inputting the grade, capacity, route, price, and the number of circuits information of the telecommunications service.

44. The method of claim 42, further comprising the step of determining the grade of a telecommunications service from the parameter values inputted.

45. The method of claim 39, wherein the step of verifying includes periodically verifying the classes of the telecommunications services available for sale.

46. The method of claim 45, further comprising the step of changing the class of a telecommunications service based on changed parameter values.

47. The method of claim 39, wherein the step of verifying includes periodically verifying the classes of the telecommunications service being used by a buyer.

48. The method of claim 47, further comprising the step of changing the class of a telecommunications service based on changed parameter values.

49. The method of claim 48, further comprising the step of assessing a penalty against a seller if its service is reassigned to a lower class.

50. The method of claim 39, further comprising the step of recommending an alternate telecommunications service to satisfy the buyer's purchase order.

51. The method of claim 39, further comprising a buyer inputting a second purchase order when no match is identified for the buyer's first purchase order.

52. The method of claim 39, wherein the step of identifying a seller's telecommunications service includes comparing the purchase order to services assigned to a class that satisfy the purchase order.

53. The method of claim 39, wherein the step of identifying a seller's telecommunications service includes selecting a sell order from a class that satisfies the purchase order.

54. The method of claim 39, wherein the step of identifying a seller's telecommunications service includes replacing a selected sell order with another sell order to satisfy the purchase order during an active use of telecommunications service that was the subject of the selected sell order.

55. A telecommunications sale system comprising:
   a plurality of sellers;
   a plurality of buyers;
   a network site connected to a server node for receiving sell and purchase offers from the sellers and buyers, respectively, for telecommunications services, each of said sell and purchase offers specifying a class of service; and
   means for matching the sell and purchase offers and brokering a transaction of telecommunications service, on the basis of at least one of the specified classes of service.

56. The systems of claim 55, further comprising an interconnection node between a seller telecommunication network and buyer telecommunication network so as to enable a buyer to use telecommunications service purchased from a seller.

57. The system of claim 55, wherein said interconnection node is connected to said server node through a communication line and receives instructions from said server node for connecting said buyer and said seller telecommunications networks.

58. The system of claim 55, wherein the network site includes a secure world-wide-web site.

59. The system of claim 55, wherein at least one of the sellers is not a telecommunications carrier.

60. The system of claim 55, wherein at least one of the buyers is not a telecommunications carrier.

61. The system of claim 55, wherein, for each purchase order, the system assigns the purchase order to a class and requests approval for the assignment from the buyer.

62. The system of claim 55, wherein, for each purchase order, the purchase order is assigned to a class and the system informs the buyer of a price at which the system will be able to match the buyer's purchase order with a sell order.

63. The system of claim 62, wherein the system gives the buyer the opportunity to enter a price for its purchase order equal to said price.

64. The system of claim 55, wherein said at least one of the specified classes of service includes Answer Seizure Ratio.

65. The system of claim 55, wherein said at least one of the specified classes of service includes Post Dial Delay.

66. The system of claim 56, wherein said interconnection node includes a quality monitoring equipment.

* * * * *